Sept. 15, 1942.  W. F. HOLEKA  2,295,949
MEANS FOR FOCUSING CAMERAS
Filed Jan. 22, 1940  2 Sheets-Sheet 1

Inventor
WILLIAM F. HOLEKA

Attorney.

Sept. 15, 1942.  W. F. HOLEKA  2,295,949
MEANS FOR FOCUSING CAMERAS
Filed Jan. 22, 1940  2 Sheets-Sheet 2

Inventor:
WILLIAM F. HOLEKA
Attorney.

Patented Sept. 15, 1942

2,295,949

UNITED STATES PATENT OFFICE 2,295,949

MEANS FOR FOCUSING CAMERAS

William F. Holeka, Los Angeles, Calif.

Application January 22, 1940, Serial No. 314,985

10 Claims. (Cl. 95—45)

This invention pertains to means for quickly focusing a still or movie camera, and for changing the focus rapidly as the focal distance of a moving object changes. A focusing scale or coupled range-finder are not employed in this invention as novel means are provided for changing the focus almost instantaneously without removing the eye from the view finder or requiring any shifting of the camera in the hands of the photographer.

Range-fingers and sight focusing means for cameras are not entirely satisfactory in poor light or where there is practically no light. When it is necessary to take flash-light shots, focusing means depending upon range-finders, view-finders and distance scales are not generally very useful and especially where speed is of importance. Applicant's invention was conceived for just such situations. In applicant's device, only the approximate distance from the camera to the object is necessary to take the picture and produce it in good sharp lines. Although this invention is very useful for focusing a camera in poor light or in no light at all, it is also very useful in focusing under the best of light conditions.

This invention comprises one or more keys and the like arranged on a camera and manually operative to shift the lens from an infinity setting to any number of intermediate settings between its shortest focus to infinity. This is accomplished by employing a common lever between the keys or push buttons and the focusing carriage of the camera. Simple mechanical elements are employed and arranged to avoid any interference with the normal use of the camera, but when the invention is brought into use, it is unerringly ready for instant use.

An object of the invention is to present an improved focusing device that is simple and rugged in construction and adapted to be combined with any kind of camera whether of the motion picture type or the still picture type.

Another object is to provide a novel camera focusing device that can be instantaneously used regardless of the lighting conditions upon the object to be photographed.

Still another object is to disclose a camera with high speed focusing apparatus that can be quickly set and changed by merely pressing one or more push buttons or the like.

Other objects, advantages and features of my invention will appear from the accompanying drawings, the subjoined detailed description, the preamble of these specifications and the appended claims.

Applicant is about to illustrate and describe one of the forms of his invention in order to teach one how to make, use and vend the same, but it is to be understood that the drawings and description thereof are not to limit the invention in any sense whatsoever, except as limited by the appended claims.

Figure 1:
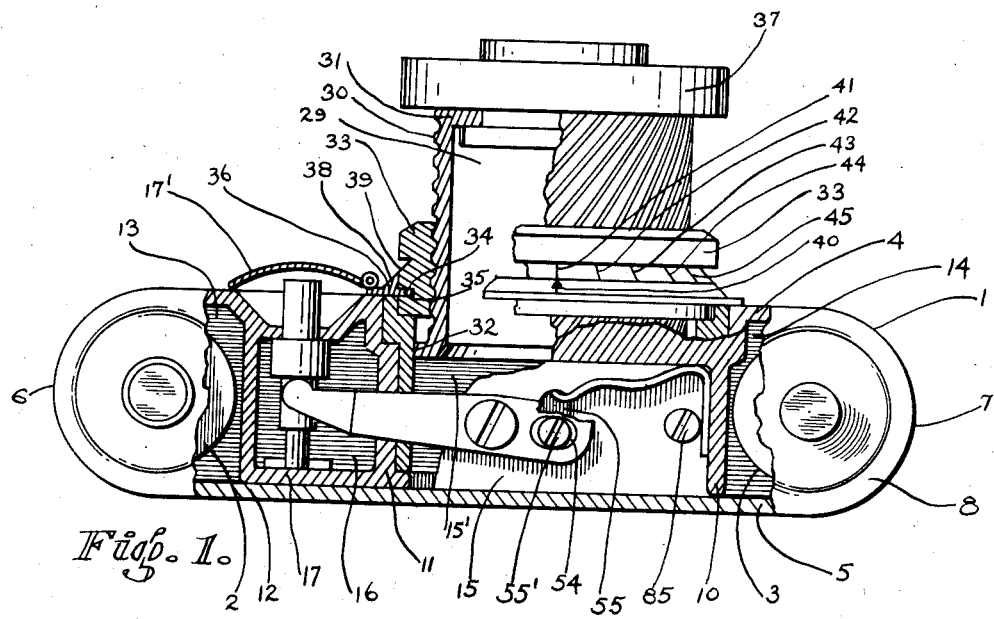
Fig. 1 shows one practical form of the invention in plan, parts thereof being broken away for the sake of clarity.
Figure 2:
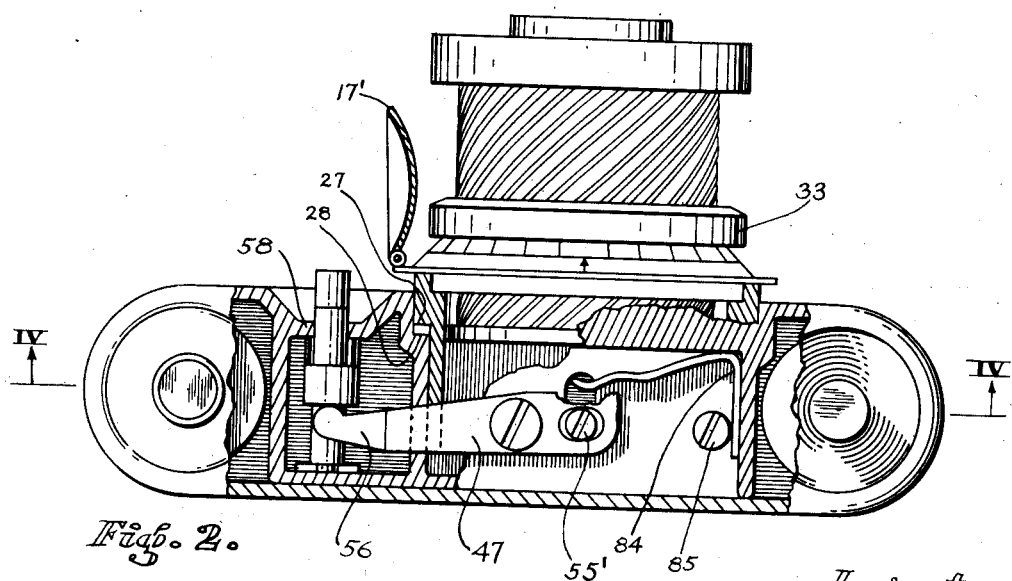
Fig. 2 is a view similar to Fig. 1, but showing the working parts in different positions.

The reference character 1 indicates the casing of a focusing camera having the end film spools 2 and 3. The casing has a front wall 4 and a back wall 5 which converge at their ends to form semi-circular end walls 6 and 7 as shown. The casing side walls are shown at 8 and 9. Transverse walls 10, 11 and 12 divide the casing to form end spool chambers 13 and 14, a large chamber 15 and a control chamber 16. The bottom of the control chamber has a wall 17 integral with the walls 11 and 12 to prevent entrance of light into the other chambers. The wall 17 is slightly spaced from the casing wall 5 and also a small space is provided between the bottom of wall 10 and the wall 5 for the obvious purpose of providing sliding room for the film stretching from spool to spool.

Within the large chamber is a well chamber 15' formed between the walls 10 and 11 by integral side walls 18 and 19 thus providing side channels 20 and 21 in communication with the control chamber 16. Within the well chamber is a shiftable shell 22 having the four integral side walls 23, 24, 25 and 26. The top periphery of the shell is offset at 27 to snugly fit a rabbet or recess 28 in the walls surrounding the shell.

Snugly fitting the inner wall of the shell 22 is a focusing block 29 having a threaded cylindrical wall 30, a top inwardly turned annular flange 31 and a bottom outwardly extended flange 32. The outer periphery of the flange 32 engages the inner surface of the shell in sliding relation and is adjustable along said surface by rotating a knurled nut 33 which is threaded to the cylindrical wall 30. This nut has an annular recess 34 into which fits an annular split ring 35 of an annular plate fixed to the face of the shiftable shell 22. The ring provides a fixed bearing for the nut and allows the focusing block to be adjusted by turning the nut. The unit 37 is the lens and shutter device for the camera and it is fixed to the outer end of the focusing block as shown.

The top surface of the plate 36 has an annulator bevelled surface 38 in alinement with a similar surface 39 recessed in the nut 33. The surface 38 has a division mark 40 as a reference mark for setting the focusing block. The surface 39 is graduated into various range settings, the division 41 indicating the "infinity" or actually hyperpocal distance setting of the lens with respect to the film plane along the back wall of the camera. The other divisions may be provided to focus at any desired distance by means of the nut 33 and independently of the quick focusing means.

The shell 22 which supports the focus block is shifted by a U-shaped lever frame 46 having legs 47 and 48 which are joined together by an integral bar 49. Along the sides of the casing are screws 50 and 51, stepped as shown, to provide pivot bearings 52 and 53 respectively, for the legs of the U-shaped lever 46. These screws are threaded into the side walls of the channel-ways 20 and 21. Near the end of each leg is a slot 54 and along the side wall of each channel-way is a short slot 55. A screw 55' is provided for each pair of slots and threaded into the side walls of the shell 22 as shown. Along the bar 49 are spaced apart U-brackets 56 and 57 which are fixed rigidly thereto as by welding, soldering or the like, the purpose of which will later become apparent.

The front of the central chamber 16 has a recessed wall 58 with a plurality of holes to accommodate the shifting elements, keys or push buttons 59, 60, 61 and 62. Each button comprises a cylindrical shell 63 having one end closed and the other open; the central portion of each button is enlarged to form a stop shoulder 64 beneath its respective hole. A coil compression spring 65 is provided for the bore of each button.

The bottom wall 17 of the control chamber is provided with a plurality of holes 66 in registration with the opposed holes in the recessed wall 58. Into each is rigidly and snugly fixed the reduced end portion are guide stems 67, a stem for each button to telescope same and engage the coil spring therein. The bottom shoulder 64' of each button is arranged to engage the top of one leg of its proximate U-bracket so that when the button is depressed, the legs 47 and 48 of the U-lever will force the shell 22 outwardly and hence change the focus of the lens 37 with respect to the film plane without changing the infinity setting along the nut 33. The amount of movement of the shell will depend upon the length of the sleeves 70, 71, 72 and 73 of the buttons 59, 60, 61 and 63 respectively.

In order to make provision for additional settings for the buttons 59 to 62 and hence keep their number thereof reduced to a minimum, a shiftable slide 74 is provided consisting of a rectangular flat plate 75 having an upstanding flange 76. Fixed to the flange is a push button 77 which extends through the casing as shown.

Figure 3:
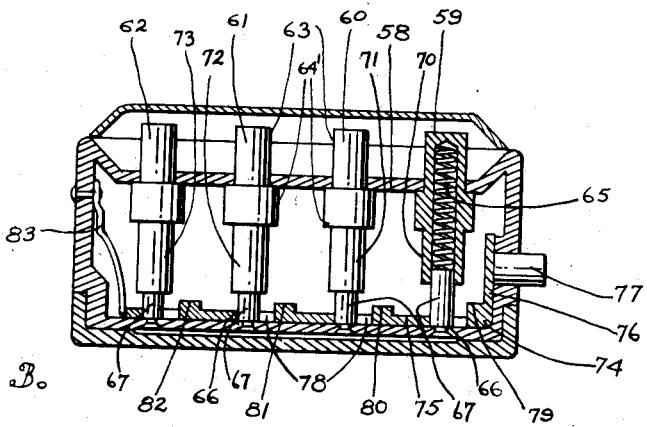
Fig. 3 shows the invention in cross section taken substantially along the line 3—3 of Fig. 4.
Figure 4:
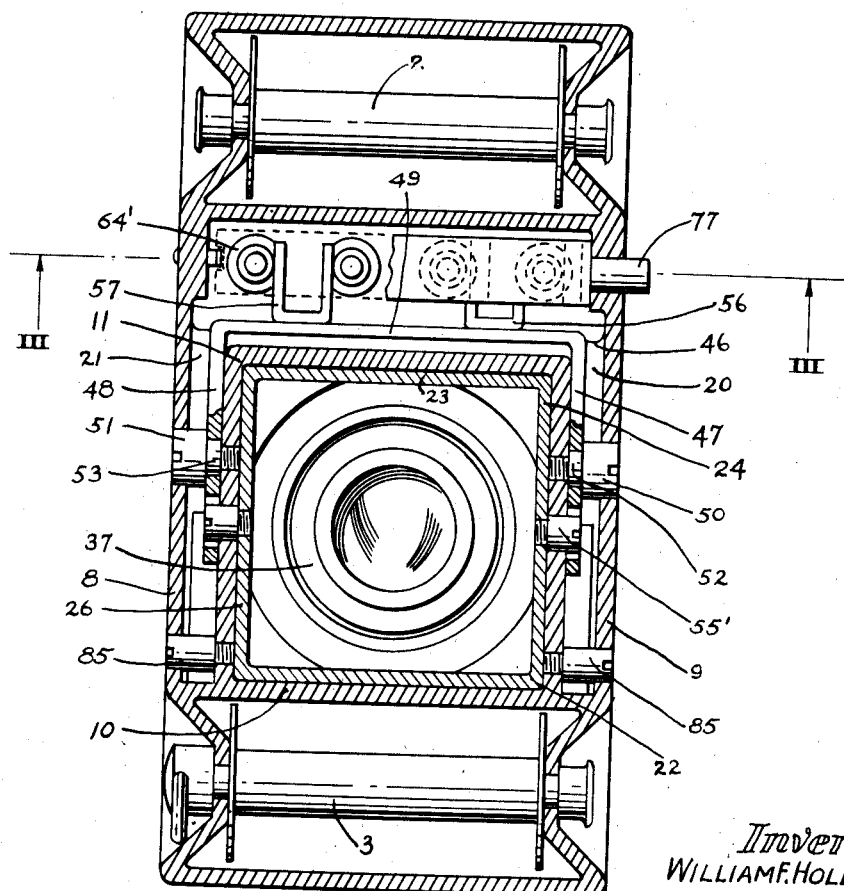
Fig. 4 is a sectional view taken substantially along the line 4—4 of Fig. 2.

The plate 75 is provided with a plurality of slots 78 so that it can be shifted without disturbing the fixed button guides 67. At the perimeter of each slot is a raised portion adapted to be shifted beneath its respective button sleeve; the raised portions 79, 80, 81 and 82 being positioned for their respective button sleeves 70, 71, 72 and 73. So that the plate returns to its normal position, as shown in Fig. 3, when the button 77 is released, a bar spring 83 is provided; one end thereof being fixed to the casing side wall and the other end engaging the end of the plate 75 as shown.

In order to return the shell 22 to its normal position, as shown in Fig. 1, when the buttons 59 to 62 are free, a bar spring 84 is provided in each channel-way on each side of the camera. Each spring is held in place by a screw 85 which prevents the spring from moving but still allows easy removal thereof when required. One end of the spring presses against the top of its proximate leg of the U-lever, the pressure being sufficient to return the shell to its lowermost position.

The raised portions 79 to 82 inclusive change the stroke of their respective button sleeves and hence provide for additional settings for the lens of the camera with respect to the film plane when the button 77 is pressed toward the casing of the camera.

It is a well known fact that a photographic lens will focus sharply in one plane only, that is, parts of an object in front or behind the plane on which the lens is focused, will be more or less out of focus, blurred. If one accepts a certain limit of this unsharpness, it can be shown that the focused field extends a short distance in front and a short distance behind the focused distance. The depth of field, sometimes called depth of focus, depends on the focal length of the lens, stop, distance focused, and the limit of permissible unsharpness known as circle of confusion (or diffusion). From the above, the depth of field (or focus) can be calculated.

According to the usual convention, a picture is sharp as long as the diffusion does not exceed $\frac{1}{100}$ of an inch. At 10 inches, the nearest distance of distinct vision, the picture appears sharp. To further explain the invention, we shall consider a camera with a lens of 75 mm. focal length, F:4.5 maximum lens opening, circle of confusion $\frac{1}{20}$ mm. (3 in. focal length, $\frac{1}{500}$ in. circle of confusion). From the above the "hyperfocal distance" of the lens is:

$$HD = f^2/F \times c$$

where $f$ is the focal length of the lens (in millimeters),
F the largest stop,
$c$ circle of confusion ($\frac{1}{20}$ of a millimeter).

Solving the equation, the hyperfocal distance is 25 meters. If the lens is focused at 25 meters, everything from half of the hyperfocal distance, 12.5 meters, to infinity will be in focus, maximum confusion being $\frac{1}{20}$ of a millimeter. The whole focusing range would be as follows:

Inf.  25  12.5  8.3  6.25  5  4.2  3.6  3.1  2.8  2.5
       x         x         x       x         x

If the camera had means to focus the lens at 25, 8.3, 5, 3.6, and 2.8 meters, its focusing range would extend from 2.5 meters to infinity. To accomplish this I have provided the four buttons 62, 61, 60 and 59 to independently move the lens to focus at 8.3, 5, 3.6, and 2.8 meters respectively, the 25 meters distance being automatically focused when the camera is opened. It can be seen that any of the four distances may be focused by simply pressing the proper button. As shown on the drawings, the top button 59 focuses the lens to 2.8 meters, button number 60 to 3.6 meters, button number 61 to 5 meters and button number 62 to 8.3 meters. The same result may be accomplished by using three buttons, one of which is used "to change" the stroke of the focusing buttons giving thereby two focusing distances for each button, a total of four settings. This system one might call "compound focusing."

If we use a "stroke changing" button with four buttons as shown in the drawings, we get two focusing distances for each button, a total of eight settings. Of course, the number of buttons may be changed to three focusing buttons and one "stroke changing" button, giving a total of settings of six. It can be seen that a great number of combinations may be had to suit different cases.

To operate the camera, the operator must know the distances at which each button focuses, in this case four. After one becomes proficient any distance may be focused instantly without taking the camera from the eye. The camera may or may not be provided with a focusing scale, rangefinder, or both, if desired, giving thereby standard focusing besides the quick-focusing means.

The camera as shown in the drawings is constructed for quick focusing at eight points, four of the settings can be made by merely pressing the buttons 59 to 62 inclusive, one at a time; the other four settings are made by first pressing the button 77, and while holding this button down, proceed to press any one of the four buttons 59 to 62 inclusive.

When eight settings are used for a camera having a focal length of 105 millimeters, an opening F:3.5, circle of confusion of $\frac{1}{45}$ mm. and at a hyperfocal distance of 47 meters, the following focal points are found and arranged for push button operation:

Inf.  47  23.5  <u>15.5</u>  11.8  <u>9.4</u>  7.8  <u>6.7</u>  5.8

5.2  4.7  <u>4.3</u>  3.9  <u>3.6</u>  3.3  <u>3.1</u>  2.9  <u>2.75</u>  2.6

All the focal points underscored with a solid line represent one of the push button positions without using the slide plate 74, that is, to focus the camera between the points 2.6 meters and 2.9 meters, push button 59 would be pressed giving sharp focus at 2.75 meters but satisfactory focus for all practical purposes between the distances of 2.6 meters and 2.9 meters from the lens. Therefore, push button 60 would give a sharp focus at 3.1, button 61 a sharp focus at 3.6, and button 62 a sharp focus at 4.3. To quickly focus the camera between the distances 4.7 meters and 23.5, the plate 74 is shifted beneath the buttons 59 to 62 by pressing inwardly on button 77. When button 77 is held inwardly, any of the buttons 59 to 62 may be pressed to set the focus at the distances between 4.7 and 23.5 meters. That is, pressed button 62 would then give the camera a sharp focus at 5.2 meters, button 61 for a sharp focus at 6.7 meters, button 60 for 9.4 meters and button 59 for 15.5 meters; this latter focus including the high point 23.5 within the circle of permissible diffusion. These positions are indicated above the dotted lines. The camera setting at 47 meters automatically takes care of the distances between 23.5 meters and infinity, therefore, no push button need be provided for this setting.

A curved closure plate 17' is provided to prevent entrance of dust and dirt into the control compartment 16. The closure plate is shown as hinged to the top of the plate 36.

Having thus described my invention, what is claimed as new and desired to be secured by Letters Patent is:

1. In a rapid focusing camera, a casing having a plurality of compartments, one compartment having a chamber to accommodate a photographic film along a plane thereof, a shell snugly fitting and shiftable in said chamber, a focusing cylinder adjustably fixed to said shell and extending outwardly from the casing, a lens attached to the cylinder and arranged to focus upon said plane, a control chamber adjacent said other chamber having a plurality of push button elements of different strokes to represent certain distances beyond the front of the lens, means arranged to be shifted by said buttons and having connection with said shell so that when one of the buttons is shifted the lens is shifted a predetermined amount to bring the plane in sharp focus with an object at a predetermined distance beyond the lens.

2. The camera recited in claim 1 wherein said control chamber extends around three sides of the film chamber, a U-shaped lever in the control chamber pivoted to the side walls thereof, and having connection with said shell, means extending from the lever beneath each button to transmit the motion of any one of the buttons to said lever and shell.

3. The camera recited in claim 1 wherein means are provided for changing the stroke of said buttons.

4. In a camera comprising a case with a film exposure compartment, a sleeve snugly fitting the compartment and adapted to be shifted therein, a focussing shell slidable in the sleeve, a collar rotatably attached to the sleeve and threadedly attached to the shell so that turning of the collar will protrude and retract the shell with respect to the sleeve and case, a chamber adjacent the sleeve having a plurality of push buttons of different lengths, and lever means connecting the buttons with the sleeve for shifting the sleeve, collar and shell as a unit to various positions with respect to the case.

5. In a camera device having a housing and a lens holder, siding means coupling the holder and housing and allowing the holder to be projected from and drawn toward the housing, lever means in the housing extending from the sliding means, a plurality of projections extending from the lever means, a button for each one of the projections and having guides attached to the housing, said buttons having portions of various lengths so that each of the buttons, when pressed, cause the holder to move a different stroke and thus vary the focus of the lens with respect to its film plane.

6. In a camera device having a lens holder and a film plane in a predetermined space apart position, a housing for the lens and film plane, means including a plurality of shiftable buttons connected to the holder and slidable in said housing, said means being adapted to shift the lens into a plurality of positions spaced from said film plane, said buttons having different length sleeves to limit the movement of the buttons.

7. In a camera device having a compartment for film to be exposed and a threaded focusing block extending from the compartment, a lens at one end of the block to focus objects upon film in the compartment, a threaded collar means attached to the compartment to shift the block to and from the compartment, push buttons to cause the first means to be shifted to predetermined positions, said buttons having sleeves of different lengths to limit the movement to their inward positions.

8. In a camera device having a compartment for film to be exposed and a threaded focusing block extending from the compartment, a lens at one end of the block to focus objects upon film in the compartment, a threaded collar means attached to the compartment to shift the block to and from the compartment, push button means to cause the first means to be shifted to predetermined positions, the second recited means including a series of push buttons with sleeves, each button sleeve having a different length and a different stroke so that each one of them will shift the collar and the block to a different predetermined focusing position.

9. In a camera, a case having a compartment with a plane to accommodate an unexposed film, a side channel on each side of the compartment and joining a cross channel to form a control chamber, said chamber being isolated from said compartment, a shiftable cylinder extending from the compartment and having a lens at one end thereof arranged in a manner that the lens can focus exterior objects upon said plane, means in the control chamber for shifting the cylinder to predetermined positions so that the camera can be rapidly focused upon exterior objects at various distances, said means including a plurality of push buttons having different strokes which represent certain distances before the lens of the camera, and means independent of said button for changing the stroke thereof.

10. In a rapid focusing camera, a casing having a plurality of compartments, one compartment having a chamber to accommodate a photographic film along a plane thereof, a shell shiftable in said chamber, a focusing cylinder adjustably fixed in said shell and extending outwardly from the casing, a lens attached to the cylinder and arranged to focus upon said plane, a control chamber adjacent said other chamber having a plurality of push buttons of different strokes to represent certain distances beyond the front of the lens, means arranged to be shifted by said buttons and having connection with said shell so that when one of the buttons is pushed downwardly, the lens is shifted a predetermined amount to bring the plane in sharp focus with an object at a predetermined distance beyond the lens, said control chamber extending around three sides of the film chamber, a U-shaped lever in the control chamber pivoted to the side walls thereof, and having connection with said shell, means extending from the lever to beneath each button to transmit the motion of any one of the buttons to said lever and shell, and slide means having raised portions for changing the stroke of said buttons.

WILLIAM F. HOLEKA.